United States Patent
Knoblauch

(10) Patent No.: US 7,073,328 B2
(45) Date of Patent: Jul. 11, 2006

(54) METHOD FOR CONTROLLING A PRESSURE SUPPLY DEVICE IN A HYDRAULIC CIRCUIT

(75) Inventor: Thomas Knoblauch, Saarbrücken (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 15 days.

(21) Appl. No.: 10/497,569

(22) PCT Filed: Nov. 29, 2002

(86) PCT No.: PCT/EP02/13463

§ 371 (c)(1),
(2), (4) Date: Jun. 3, 2004

(87) PCT Pub. No.: WO03/048614

PCT Pub. Date: Jun. 12, 2003

(65) Prior Publication Data

US 2005/0002796 A1    Jan. 6, 2005

(30) Foreign Application Priority Data

Dec. 4, 2001 (DE) .................. 101 59 519

(51) Int. Cl.
*F16D 31/02* (2006.01)

(52) U.S. Cl. ............... 60/368; 60/403; 60/452

(58) Field of Classification Search .......... 60/368, 60/399, 403, 431, 452, 468
See application file for complete search history.

(56) References Cited

U.S. PATENT DOCUMENTS

| | | | |
|---|---|---|---|
| 4,393,732 A | | 7/1983 | Suzuki et al. |
| 4,704,685 A | * | 11/1987 | Martinsons et al. ........ 701/114 |
| 4,809,504 A | | 3/1989 | Izumi et al. |
| 4,856,380 A | | 8/1989 | Murano et al. |
| 4,886,422 A | | 12/1989 | Takeuchi et al. |
| 5,105,922 A | * | 4/1992 | Yant ..................... 192/3.58 |
| 5,934,880 A | | 8/1999 | Yamada et al. |
| 5,951,615 A | | 9/1999 | Malson |
| 6,022,293 A | | 2/2000 | Dourra et al. |
| 6,048,177 A | | 4/2000 | Erkkilae et al. |
| 6,273,525 B1 | | 8/2001 | Erban et al. |

FOREIGN PATENT DOCUMENTS

| | | |
|---|---|---|
| DE | 38 23 283 C2 | 9/1992 |
| DE | 37 79 435 T2 | 1/1993 |
| DE | 197 51 274 A1 | 6/1998 |
| DE | 195 38 649 C2 | 5/2000 |
| DE | 101 12 131 A1 | 9/2001 |
| DE | 698 06 101 T2 | 11/2002 |
| EP | 1 205 690 A2 | 5/2002 |
| JP | 2000055184 A | 2/2000 |

\* cited by examiner

*Primary Examiner*—Edward K. Look
*Assistant Examiner*—Michael Leslie
(74) *Attorney, Agent, or Firm*—Davis & Bujold, P.L.L.C.

(57) ABSTRACT

The invention relates to a method for controlling a pressure supply device in a hydraulic circuit, especially in a hydraulic circuit in an automatic gearbox which comprises an hydraulic pump, a pressure control valve and a consumer. The hydraulic pump is controlled if the system pressure falls below a specific lower threshold value and is switched off if a specific higher threshold value of the system pressure is reached or exceeded. In the data on the system pressure is not available, the current system pressure is calculated.

13 Claims, No Drawings

METHOD FOR CONTROLLING A PRESSURE SUPPLY DEVICE IN A HYDRAULIC CIRCUIT

This application is a national stage completion of PCT/EP02/13463 filed Nov. 29, 2002 which claims priority from German Application Serial No. 101 59 519.0 filed Dec. 4, 2001.

FIELD OF THE INVENTION

The invention relates to a method for control of a pressure supply device in a hydraulic circuit, especially in a hydraulic circuit of an automatic transmission.

BACKGROUND OF THE INVENTION

A hydraulic circuit usually comprises one device for producing the system pressure such as a pressure pump (hydraulic pump), one pressure sensor, one pressure reservoir, one overpressure valve, one recoil valve and one or more consumers which are connected with one working valve.

According to the prior art, the hydraulic pump is controlled in the normal operation of the hydraulic circuit when the system pressure falls below a specific lower threshold value and is switched off when a specific upper threshold value has been reached or exceeded. Thereby the system is operated within a specific pressure range. Typical values for the upper threshold value are in the order of 80 bar, for the lower threshold value, on the other hand, in the order of 60 bar, for example, the system being operable with limitations between 60 bar and about 40 bar. Starting at 90 bar, the overpressure valve opens and after lowering of the pressure it closes at 65 bar, for example. Depending on the need, other values are to be taken into account for the threshold values and the limiting pressures.

When the pressure sensor signal in such a hydraulic system or hydraulic circuit is not available, or there is no longer access to the pressure system—as result, for example, of failure of the pressure sensor—the control is problematic. This results in that the system is either switched off or the hydraulic pump is permanently actuated.

This procedure has the disadvantage that due to the permanent actuation the pump is permanently loaded and eventually damaged due to the increased wear. Besides, the overpressure valve is steadily stressed whereby it is also exposed to increased wear.

The problem on which this invention is based is to outline a method for control of a pressure supply device in a hydraulic circuit, especially in a hydraulic circuit of an automatic transmission which, in case o, failure of the pressure sensor or if there is no longer direct access to the system pressure, the availability of the hydraulic circuit and a protected operation of the elements thereof is ensured.

The time and frequency of switching in of the pump and of the overpressure valve are to be specially limited in order to keep the wear as small as possible.

SUMMARY OF THE INVENTION

Accordingly, when an error occurs in the pressure system, it is indirectly proposed to determine or calculate the actual system pressure and to control or operate the hydraulic pump according to said determined and calculated values. The hydraulic pump is switched in when the calculated system pressure falls below a specific threshold value and switched off when a specific upper threshold value of the calculated system pressure is reached or exceeded.

DETAILED DESCRIPTION OF THE INVENTION

According to the invention, the system pressure is determined and calculated as follows.

On the basis of the last actual signal of the pressure sensor prior to occurrence of the state of error, the volume consumption of hydraulic oil is calculated or determined via the time the working valves of the consumer are switched in and via the directional position of the pistons or of the selector and gear pistons of the actuators concerned. In case of an automatic transmission, these are the selector and gear pistons of the transmission actuator and the pistons of the clutch actuator. The pressure/volume characteristic line of the pressure storage of the system pressure is subsequently calculated.

Within the scope of a preferred variation of the inventive method, a predetermined value is added to the calculated volume consumption of hydraulic oil in order to ensure that the hydraulic circuit operates in a reliable state. Leakage losses in the form of an offset can be taken into account.

In case the last actual signal of the pressure sensor is not available or is not present, for example, when restarting the hydraulic circuit, the system pressure is assumed to be zero and the hydraulic pump is actuated until the system pressure has reached a value in the working range based on the above explained calculations.

To prevent critical situations which can result from the actual system pressure being higher than the assumed value zero, the threshold values of the overpressure valve are selected so that the hydraulic circuit can be operated even if with eventual limitations.

By virtue of the inventive method the hydraulic circuit remains still available when the error occurs. In addition, disadvantages are preventable, such as increased wear and increased probability of failure, which are due to the permanent actuation of the hydraulic pump and the overpressure valve. The invention further results in cost reduction, since there is no need of designing the stronger parts of concern.

The invention claimed is:

1. A method for control of a pressure supply device in a hydraulic circuit of an automatic transmission, which comprises a hydraulic pump, a overpressure valve and a consumer, the hydraulic pump being controlled when a system pressure has fallen below a specific lower threshold value and switched off when a specific upper threshold value of the system pressure has been one of reached or exceeded, and when data for the system pressure is not available, an actual system pressure is calculated from a volume consumption of hydraulic oil determined for the consumer.

2. The method according to claim 1, wherein for the calculation of the system pressure the volume consumption of hydraulic oil is first determined and thereafter the system pressure is calculated by a pressure/volume characteristic line of a pressure storage of the system pressure.

3. The method according to claim 2, wherein the volume consumption of hydraulic oil is calculated or determined by a last actual signal of a pressure sensor, of a time working valves of the consumer are switched in and of a directional position of a plurality of pistons or of the selector and gear pistons of the consumer concerned.

4. The method according to claim 3, wherein in a case of an automatic transmission, a directional position of the selector and gear pistons of a transmission actuator and of a piston of a clutch actuator are taken into account.

5. The method according to claim 2, wherein to the calculated volume consumption of hydraulic oil, a predetermined value is added in order to ensure that the hydraulic circuit operates in a reliable state.

6. The method according to claim 1, wherein in case a last actual signal of a pressure sensor is not available, a value of zero is assumed for the system pressure.

7. The method according to claim 6, wherein the threshold values of an overpressure valve are selected so that the hydraulic circuit is reliably operated.

8. A method for control of a pressure supply device in a hydraulic circuit of an automatic transmission which comprises a hydraulic pump, a overpressure valve and a consumer, the hydraulic pump being controlled when a system pressure falls below a specific lower threshold value and switches off when a specific threshold value of the system pressure is one of reached or exceeded, and when data for the system pressure is not available, an actual system pressure is calculated;

wherein for calculation of the system pressure a volume consumption of hydraulic oil is first determined and thereafter the system pressure is calculated by means of a pressure/volume characteristic line of a pressure storage of the system pressure.

9. The method according to claim 8, wherein the volume consumption of hydraulic oil is calculated or determined by means of a last actual signal of a pressure sensor, of a time working valves of the consumer are switched in and of a directional position of a plurality of pistons or of the selector and gear pistons of the consumer concerned.

10. The method according to claim 9, wherein in a case of an automatic transmission, a directional position of the selector and gear pistons of a transmission actuator and of a piston of a clutch actuator are taken into account.

11. The method according to claim 8, wherein to the calculated volume consumption of hydraulic oil, a predetermined value is added in order to ensure that the hydraulic circuit operates in a reliable state.

12. The method according to claim 8, wherein in case a last actual signal of a pressure sensor is not available, a value of zero is assumed for the system pressure.

13. The method according to claim 12, wherein the threshold values of an overpressure valve are selected so that the hydraulic circuit is reliably operated.

* * * * *